United States Patent
Sprunt et al.

[11] Patent Number: 5,214,384
[45] Date of Patent: May 25, 1993

[54] METHOD INCLUDING ELECTRICAL SELF POTENTIAL MEASUREMENTS FOR DETECTING MULTIPHASE FLOW IN A CASED HOLE

[75] Inventors: Eve S. Sprunt, Farmers Branch; Nizar F. Djabbarah, Richardson, both of Tex.

[73] Assignee: Mobil Oil Corporation, Fairfax, Va.

[21] Appl. No.: 734,834

[22] Filed: Jul. 24, 1991

[51] Int. Cl.$^5$ .............. G01V 3/26; E21B 43/24; E21B 47/10; E21B 49/00
[52] U.S. Cl. .................. 324/351; 73/155; 166/252; 166/272; 324/325; 324/353
[58] Field of Search .............. 324/323–325, 324/348, 351, 353, 366, 372; 73/152, 155; 166/250, 251, 252, 272

[56] References Cited

U.S. PATENT DOCUMENTS

| | | | |
|---|---|---|---|
| 3,496,768 | 2/1970 | Boucher | 324/348 X |
| 4,253,063 | 2/1981 | Tweeton | 324/372 X |
| 4,470,462 | 9/1984 | Hutchison | 166/292 |
| 4,501,329 | 2/1985 | DePriester | 166/292 |
| 4,523,148 | 6/1985 | Maciejewski | 324/351 |
| 4,523,642 | 6/1985 | Venkatesan | 166/272 |
| 4,629,000 | 12/1986 | Hurd | 166/274 |
| 4,633,948 | 1/1987 | Closmann | 166/271 |
| 4,756,369 | 7/1988 | Jennings, Jr. | 166/272 |
| 4,804,043 | 2/1989 | Shu | 166/263 |
| 4,817,713 | 4/1989 | Nguyen | 166/252 |
| 4,903,767 | 2/1990 | Shu | 166/270 |
| 4,916,616 | 4/1990 | Freedman | 364/422 |

FOREIGN PATENT DOCUMENTS 1140079  2/1985  U.S.S.R. .............. 324/351

*Primary Examiner*—Gerard R. Strecker
*Attorney, Agent, or Firm*—A. J. McKillop; G. W. Hager; C. A. Malone

[57] ABSTRACT

A method for time lapse electric logging in a cased hole in which electrodes are implanted in the casing or the hole is completed with a gravel packed non conductive, perforated liner that allows an open hole logging tool to be used for time-lapse logging. Thereafter, the implemented electrodes or a self-potential (SP) logging tool are used to monitor a steam-flooding EOR method by detecting two-phase flow with time lapse logging. A potential drop between the surface and zones of interest is measured with electrodes installed in a non-conductive casing or the SP logging tool.

12 Claims, 1 Drawing Sheet

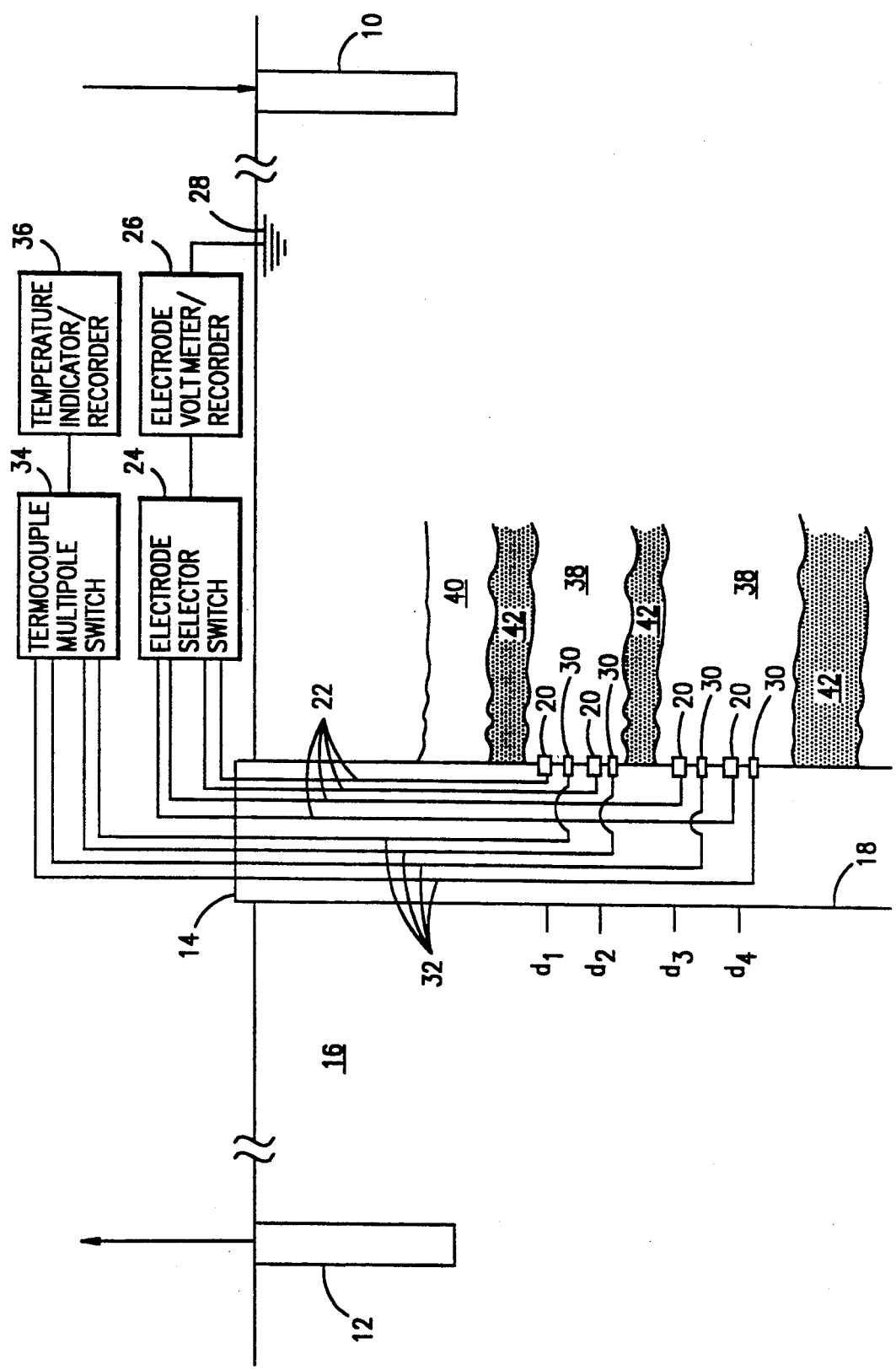

METHOD INCLUDING ELECTRICAL SELF POTENTIAL MEASUREMENTS FOR DETECTING MULTIPHASE FLOW IN A CASED HOLE

FIELD OF THE INVENTION

This invention relates generally to thermally enhanced oil recovery. More specifically, this invention provides a method and apparatus for accurately developing steam injection profiles in steam injection wells via electric self potential measurements.

BACKGROUND OF THE INVENTION

In the production of crude oil, it is sometimes found that the crude oil is sufficiently viscous to require steam injection into the petroleum reservoir. Ideally, the petroleum reservoir would be completely homogeneous and steam would enter all portions of the reservoir evenly. However, it is often found that this does not occur. Instead, steam selectively enters a small portion of the reservoir while effectively bypassing other portions of the reservoir. Eventually, "steam breakthrough" occurs and most of the steam flows directly from an injection well to a production well, bypassing a large part of the petroleum reservoir and producing significant amounts of wasted heat.

It is possible to overcome this problem with various remedial measures, e.g., by using foam or by plugging off certain portions of the injection well. For example, see U.S. Pat. Nos. 4,470,462 and 4,501,329 which are hereby incorporated by reference herein. However, to institute these remedial measures, it is necessary to determine which portions of the reservoir are selectively receiving the injected steam. This is often a difficult problem.

Various methods have been proposed for determining how injected steam is being distributed in the wellbore. D. E. Bookout et al. in a publication entitled "Injection Profiles During Steam Injection", SPE Paper No. 801-843 C, pp. 1-16, dated May 3, 1967 summarizes some of the known methods for determining steam projection profiles.

The first and most widely used of these methods is known as a "spinner survey". In this method, a tool containing a freely rotating impeller is placed in the wellbore. As steam passes the impeller, it rotates at a rate which depends on the velocity of the steam. The rotation of the impeller is translated into an electrical signal which is transmitted up the logging cable to the surface where it is recorded on a strip chart or other recording device.

As is known to those skilled in the art, these spinners are greatly affected by both the quality and the rate of steam injection into the well. Steam quality and rate decrease with depth leading to unreliable and unreproducible results.

Radioactive tracer surveys are also used in many situations. With this method methyl iodide (131) has been used to trace the vapor phase. Sodium iodide has been used to trace the liquid phase. Radioactive iodine is injected into the steam between the steam generator and the injection well. Injected tracer moves down the tubing with the steam until it reaches the formation, where the tracer is temporarily held on the face of the formation for several minutes. A typical gamma ray log is then run immediately following the tracer injection. The recorded gamma ray intensity at any point in the well is then assumed to be proportional to the amount of steam injected at that point.

Vapor phase tracers have variously been described as alkyl halides (methyl iodide, methyl bromide, and ethyl bromide) or elemental iodine. The arrival of the radioactive tracer is a function of steam quality. Since quality decreases with depth then most of the material would be dissolved in the liquid phase in the lower portion of the injection well leading to unreliable measurements.

Although these methods can be utilized, what is needed is a simple and efficient method for determining the rate of steam injection and the quality of the steam injected. It is important to determine which intervals of the formation are accepting steam and the quality of the steam both at the injection wellbore and at an observation well away from the injector.

SUMMARY OF THE INVENTION

This invention is directed to a time lapse electric logging method where spontaneous or self potential (SP) measurements are utilized. In the practice of this invention, electric self potential is measured at various depths in a wellbore through the formation. Thereafter, steam injection is commenced while measuring electric self potential over a time period at depths or intervals where it is desired to inject steam. Electric self potential measurements obtained before steam injection was commenced are compared over time with self potential measurements obtained at the same depths after commencement of steam injection. Differences between the measurements are compared for the steam injection period. An increase in electric self potential over the steam injection period is indicative of steam front advance and, if the magnitude of the increase is high enough, a potential steam breakthrough. By comparing self potential changes at the various depths or intervals, a steam injection profile can be developed for the formation from which it is desired to remove hydrocarbonaceous fluids.

It is therefore an object of this invention to use electric self potential to develop a steam injection profile of a formation or reservoir.

It is another object of this invention to detect a change from two phase to one phase steam flow during steam injection with time lapse self potential logging.

It is yet another object of this invention to use electric self potential to evaluate vertical steam sweep efficiency and to mitigate steam breakthrough.

BRIEF DESCRIPTION OF THE DRAWING

The drawing is a schematic representation which depicts an observation well in fluid communication with an injection and a production well.

BRIEF DESCRIPTION OF THE PREFERRED EMBODIMENTS

In the practice of this invention, a wellbore is logged while drilling a well. Methods for determining self-potential measurements in a drilled well are discussed in U.S. Pat. No. 4,523,148 which issued to Maciejewski on Jun. 11, 1985. This patent is hereby incorporated by reference herein in its entirety. Standard well logs are run to identify hydrocarbon bearing intervals. One skilled in the art can from the well logs ascertain intervals in the formation where oil or hydrocarbonaceous fluids can be possibly located. Using this information, the well is completed and cased. Later, the well is perforated at those intervals where it has been determined that oil will be produced. If the hydrocarbonaceous fluids are very viscous, thermal enhanced oil recovery methods may be used to cause said fluids to flow into the well for production to the surface. Steam injection or steam flooding is a commonly utilized thermal oil recovery method. Steam injection into a formation to recover hydrocarbonaceous fluids is mentioned in U.S. Pat. No. 4,817,713 which issued to Nguyen, et al. on Apr. 4, 1989. This patent is hereby incorporated by reference herein.

When steam injection is used to remove hydrocarbonaceous fluids from a reservoir or formation, the progress and pattern (profile) of the steam may be monitored at an observation well. This observation well is generally cased with a metal or fiberglass liner material which is unperforated. Use of an observation well in a steam drive is discussed in U.S. Pat. No. 4,633,948 which issued to Closmann on Jan. 6, 1987. This patent is hereby incorporated by reference herein. Presently, metal or fiberglass lined observation wells are used as temperature observation wells.

Referring to the drawing, an observation well 14 is drilled into formation or reservoir 16 between an injector well 10 and a producer well 12. Hydrocarbonaceous or oil-bearing zones 38 are determined by coring and directly measuring oil and water saturations with depth or by conducting open-hole logs such as dual induction logging followed by compensated neutron/litho-density logging. Compensated neutron/litho-density logging is mentioned in U.S. Pat. No. 4,916,616 which issued to Schlumberger Inc. on Apr. 10, 1990. This patent is hereby incorporated by reference herein. The specific tool discussed there is an electromagnetic propagation tool which is identified by the trademark "EPT". In order to establish baseline conditions, an open-hole SP log is taken. Prior to placement of casing 18 into the wellbore, casing 18 is perforated so as to allow fluid communication at those intervals which are anticipated to contain oil or hydrocarbons when it is positioned in observation well 14. Afterwards electrode 20 and thermocouple 30 are placed in casing 18 at each anticipated oil-bearing zone 38. If a metallic casing is used, then a non-conductive barrier is placed between electrode 20 and casing 18. For this purpose, a ceramic ring is preferred, but any other durable electric insulator may be used.

As is shown in FIG. 1, several intervals exist in formation 16. A water bearing zone or interval 40 is located above shale zone 42. In order to obtain contact with oil bearing zone 38, electrodes 20 are placed at different depths in casing 18 so as to communicate with oil bearing zone 38. These oil bearing zones 38 are shown as depths d-1 through d-4. By placing electrodes 20 into casing 18 in this manner, the electrodes will contact oil bearing zones 38 at depths d-1 through d-4.

Electrode cables 22 connect wellbore electrodes 20 to a multipole "rotary or multipositional" electrode selector switch 24. Electrode selector switch 24 is connected to a direct current electrode volt meter/recorder 26. Electrode volt meter/recorder 26 is used to read a voltage drop between wellbore electrodes 20 and reference electrode 28 located in a mud pit (not shown). Multipole electrode selective switch 24 can be used to connect reference electrode 28 to electrode 20 at either of the desired depths, i.e., d-1 through d-4. A similar arrangements is used to measure and record the temperature at each depth, i.e., d-1 through d-4. For this purpose, thermocouple 30 is connected by thermocouple cables 32 to thermocouple multipole switch 34. Thermocouple multipole switch 34 is then connected to digital temperature indicator/recorder 36. By manipulating thermocouple multipole switch 34, an operator can selectively obtain temperature readings at depths d-1 through d-4.

Although this invention can best be used at the beginning of a steam fluid, it can be used at any time during the life of a steamflood to monitor the progress of a steamfront at a desired depth. As will be readily recognized by those skilled in the art, it can also be used effectively when beginning steam injection into a formation.

As is preferred, the invention can best be used at the beginning of a steamflood but may be initiated any time during the life of a steamflood. Prior to commencing steam injection, self potential measurements and temperature measurements are obtained at each of the depths or intervals where steam injection will be directed for the removal of hydrocarbonaceous fluids. Once the measurements are obtained steam injection is initiated in the injection well. As steam injection continues, self potential and temperature measurements are made and recorded for each interval. Monitoring continues at the observation well which is closed to the atmosphere. Comparisons are made during steam injection in order to monitor the progress of the steamfront a desired depth. From these comparisons any substantial decrease in the self potential at an interval is deemed to be the interval at which steam has broken through. By continually monitoring increases in the self potential at an interval, the quality of the steam which has broken through can be ascertained.

When the self potential measurements indicate single phase flow, an operator can elect to take steps to prevent steam breakthrough at an interval. These measures are well known to those skilled in the art and may include the use of foam to divert steamflow or polymer gels to close off an interval where steam has broken through. A method where polymer gels are used to close off an interval or zone in a formation for profile control is discussed in U.S. Pat. No. 4,804,043 which issued to Shu et al. on Feb. 14, 1989. This patent is hereby incorporated by reference herein.

The use of this invention is not restricted to observation wells. It may be used equally effectively in an injection well to determine a steam injection profile or in a production well. In another embodiment of this invention, after a non-conductive liner (e.g. fiberglass) containing the electrodes is placed in the well, the liner is gravel-packed to allow maximum communication between borehole fluid and the formation.

Alternatively, instead of placing electrodes in a liner and obtaining measurements as discussed above, an electromagnetic propagation tool can be used to monitor potential changes for predicting steam breakthrough.

As presently understood, there are several mechanisms which cause self potential characteristics to be exhibited in a formation. One is mechanical and the others are chemical. While not desiring to be bound to a particular theory, it has been shown in the laboratory that the electrokinetic or streaming potential has increased by a factor of 3 to about 5 when there is two-phase flow instead single phase flow. Thus although streaming potential is not usually a large component of self-potential, changes in streaming potential due to a change from single to two-phase flow may be detectable. In an article entitled "Streaming Potential of Steam" authored by C. K. Tyran and S. S. Marsden and published in *Geothermal Resources Council,* Vol. 9, part 2, pages 71–64 (1984), the streaming potential behavior of dry and wet steam was investigated. For the flow of wet steam, it was discovered that an electrical potential along a capillary tube was generated. This potential built up to values greater than 100 v. It appeared that the potential build-up resulting from wet steam flow was due to small water slugs passing through the capillary. The average potential build-up for a given time interval was found to increase with pressure drop.

Dry steam, as is known to those skilled in the art, is steam which is water vapor with no liquid water. This steam is designated as one-phase steam flow. Two-phase steam flow is synonymous with wet steam. Wet steam is water vapor with liquid water. The amount of liquid water in wet steam is indicative of steam quality.

When steam breakthrough occurs at an interval, a potential decrease will be detected by the electrodes. By observing potential changes at designated intervals, an operator can determine which intervals are and are not receiving steam. A steam profile of the formation can thus be obtained.

While this invention has been described in conjunction with steamflooding, it can be used with a steam-foam flood. Self potential in foams is mentioned in an article entitled "The Streaming Potential and The Rheology of Foam" that was authored S. H. Raza and S. S. Marsden in the *Society of Petroleum Engineering Journal,* (1967), pages 359-368. An experimental and theoretical study of streaming potential generated during a flow of foam resulted in several conclusions. First, the streaming potential was directly proportional to the pressure differential applied across a flow system and to a radius of the flow channel. Second, the streaming potential of foam is greatly dependent upon the quality of foam; and the higher the quality, the greater the streaming potential. Third, the foams generated from ionic surfactants produce lower streaming potentials than those from nonionic surfactants.

In addition to being used in steamflooding and steam-foam flooding, this invention can also be used in other enhanced oil recovery (EOR) operations such as miscible or immiscible gas drives which can utilize carbon dioxide, nitrogen, hydrocarbons, flue gas, as the displacing fluid or surfactant and can also be used in surfactant polymer flooding. U.S. Pat. No. 4,903,767 discusses use of a carbon dioxide EOR process. Vaporizable hydrocarbon drive fluids are disclosed in U.S. Pat. No. 4,756,369. Oil recovery by surfact-alcohol waterflooding is taught in U.S. Pat. No. 4,629,000. Nitrogen and flue gas are used as a driving fluid in U.S. Pat. No. 4,523,642. These patents are hereby incorporated herein by reference. In addition to these applications, SP logs can be used to monitor changes in those applications where a single flow changes to a multi-phase fluid flow.

Obviously, many other variations and modifications of this invention as previously set forth may be made without departing from the spirit and scope of this invention as those skilled in the art readily understand. Such variations and the purview and scope of the appended claims.

What is claimed is:

1. A time lapse electric logging method where self potential measurements are utilized to determine steam quality comprising:
   a) measuring electric self potential via a wellbore at various levels in a formation where it is desired to inject steam;
   b) thereafter injecting steam into said levels via the wellbore while measuring electric self potential at said levels;
   c) using any measurements of increased electric self potential at each level to detect continuously two-phase steam flow; and
   d) thereafter using measurements of a decrease in electric self potential at a level to detect one-phase steam flow thus indicating where steam breakthrough has occurred at a level and that steam quality at a level has increased because of a change from two-phase steam flow to one-phase steam flow.

2. The method as recited in claim 1 where an increase in electric self potential reflects electrokinetic or streaming potential.

3. The method as recited in claim 1 where about a two to three fold increase in electric self potential indicates two phase steam flow instead of single phase steam flow.

4. The method as recited in claim 1 where steam entry into each level is used to evaluate vertical sweep efficiency and to mitigate steam breakthrough when steam enhanced oil recovery methods are utilized.

5. The method as recited in claim 1 where steam entry into each level is used to to accurately ascertain a steam injection profile.

6. The method as recited in claim 1 where the wellbore comprises a perforated nonconductive gravel packed liner which provides for maximum fluid communication between said wellbore and formation.

7. The method as recited in claim 1 where the wellbore comprises a perforated conductive or nonconductive liner.

8. The method as recited in claim 1 where the wellbore comprises a perforated fiberglass liner.

9. The method as recited in claim 1 where self potential measurements are obtained by time lapse self potential logging.

10. The method as recited in claim 1 where the wellbore comprises a conductive or nonconductive casing with implanted electrodes.

11. The method as recited in claim 1 where self potential measurements are used to detect steam and steam-foam fronts in a steam-foam process.

12. The method as recited in claim 1 where the borehole comprises a conductive or nonconductive casing with implanted electrodes where a potential drop is taken as a measure of the electrical self potential and is indicative of steam quality.

* * * * *